United States Patent [19]

Tashiro et al.

[11] Patent Number: 4,599,011
[45] Date of Patent: Jul. 8, 1986

[54] ARTICLE-JOINING DEVICE

[75] Inventors: Hidenori Tashiro, Hirakata; Minoru Watanabe, Kokubunji, both of Japan

[73] Assignee: Kabushiki Kaisha Murakoshi Seiko, Tokyo, Japan

[21] Appl. No.: 793,754

[22] Filed: Nov. 1, 1985

[30] Foreign Application Priority Data

Nov. 7, 1984 [JP] Japan .......................... 59-168969[U]

[51] Int. Cl.⁴ .......................... B25G 3/00; F16B 7/08
[52] U.S. Cl. .................................. 403/407.1; 403/245
[58] Field of Search ................. 403/245, 407.1, 406.1, 403/231

[56] References Cited

U.S. PATENT DOCUMENTS 4,202,645  5/1980  Giovannetti ...................... 403/407
4,518,278  5/1985  Koch .............................. 403/245 X Primary Examiner—Andrew V. Kundrat
Attorney, Agent, or Firm—James E. Nilles

[57] ABSTRACT

An article-joining device wherein an engagement projection is formed on a body of a fastening member adapted to be rotatably fitted in a second member, the second member being connected to a first member through a connecting rod, and a cylindrical fastener case is provided to be fitted on the outer side of the body of the fastening member and is formed on its outer side with a plurality of fixing ridges to be retained in a mounting hole of the second member, in its side with an insert hole corresponding to the insert hole of the fastening member, in its inner side with a guide groove extending longitudinally thereof for guiding therein the engaging projection of the fastening member, and in an upper portion of its inner side with a step extending circumferentially thereof and merging into the guide groove for engaging and supporting the engaging projection.

2 Claims, 6 Drawing Figures

ARTICLE-JOINING DEVICE

BACKGROUND OF THE INVENTION

1. Field of the Invention

The present invention relates to an article-joining device or joint for assembling a piece of furniture.

2. Description of the Prior Art

A joint to be used in the prior art for assembling a piece of furniture is disclosed in Japanese Patent Laid-Open No. 58 - 137606, for example. In the joint disclosed, a connecting rod having a fastening head at its leading end is attached to a side plate of the furniture or the like, and a fastening member to come into engagement with the fastening head of the connecting rod to fasten the same to a shelf plate of the furniture or the like is made rotatable so that the fastening head of the connecting rod engages the fastening member, as the latter is turned, to join the side plate and the shelf plate.

The furniture using the joining device described above has its side and shelf plates shipped as a unit, because of relatively feasible assembly on site, so that it is assembled at the destination. In this case, in order to make the work on site easier, the fastening members are attached in advance to the shelf plate or the like before they are shipped. Since the fastening members are fitted rotatably in the mounting holes of the shelf plate or the like, however, they are liable to come out during their transportation.

Since the fastening members are rotatable, moreover, they are liable to come out of position in the rotating direction when it is troublesome to reposition them relative to the connecting rod.

SUMMARY OF THE INVENTION

The present invention is designed to solve the above-specified problems and has an object of providing an article-joining device which is enabled to prevent its fastening member from coming out and to facilitate the positioning for joining the same.

According to the present invention, there is provided an article-joining device comprising: a connecting rod 1 adapted to be attached to a first member 31 such as a side plate of a piece of furniture; and a fastening member 11 attached rotatably to a second member 33 such as a shelf plate of said furniture, said connecting rod 1 having its stem 2 formed at the leading end thereof with a fastening head 4 through a reduced insert 3 and at its base with a fixing portion 6 to be attached to said first member 31; said fastening member 11 having its column-shaped body 12 formed in the side thereof with both an insert hole 13, into which the fastening head 4 of said connecting stem 2 is to be inserted, and a slot 14 for receiving the insert 3 of said connecting rod 1 laterally from one side of said insert hole 13, said fastening member 11 being formed on the inner side of said slot 14 with a cam face 15 for fastening said fastening head 4, wherein the improvement is characterized: in that said fastening member 11 has its body 12 formed with an engagement projection 18 on one side thereof; and in that a cylindrical fastener case 21 is provided to be fitted on the outer side of the body 12 of said fastening member 11 and is formed on its outer side with a plurality of fixing ridges 23 to be retained in a mounting hole 34 of said second member 33, in its side with an insert hole 24 corresponding to the insert hole 13 of said fastening member 11, in its inner side with a guide groove 25 extending longitudinally thereof for guiding therein the engagement projection 18 of said fastening member 11, and in an upper portion of its inner side with a step 26 extending circumferentially thereof and merging into said guide groove 25 for engaging and supporting said engagement projection 18.

In the article-joining device according to the present invention: the fastening member 11 is fitted in the mounting hole 34 of the second member 33 through the fastener case 21 disposed externally thereof; and the fastener case 21 is fixed in the second member 33 through said fixing ridges 23; and the engagement projection 18 of the fastening member 11 is brought into engagement with the inside step 26 of the fastener case 21 to support the fastening member 11.

BRIEF DESCRIPTION OF THE INVENTION

Other objects and features of the present invention will be described with reference to the accompanying drawings, in which.

DESCRIPTION OF THE PREFERRED EMBODIMENT

Figure 1:
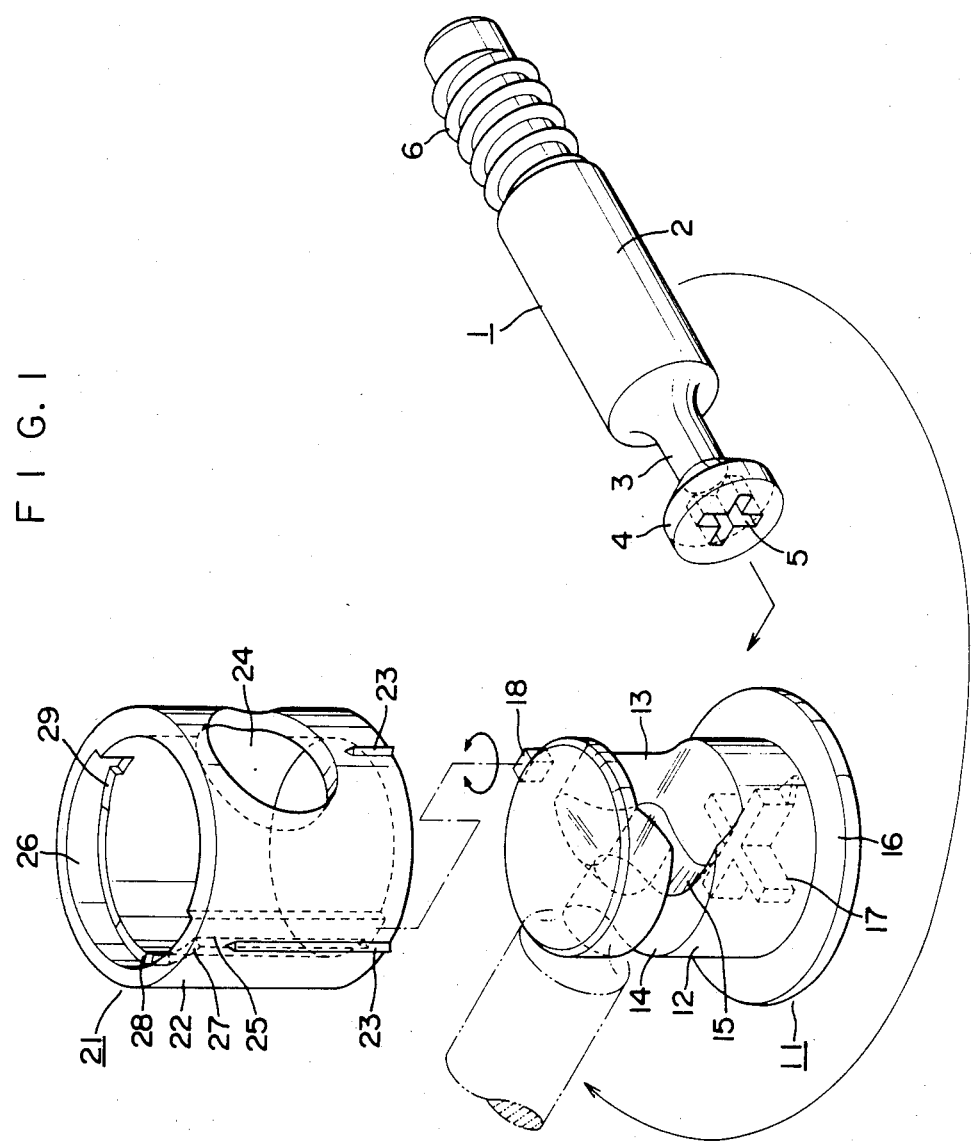
FIG. 1 is a perspective view showing one embodiment of the article-joining device according to the present invention.

Indicated at reference numeral 1 in FIG. 1 is a connecting rod which is integrally made of a metal. This connecting rod 1 has its circular stem 2 formed through a reduced insert or intermediate portion 3 with a conical fastening head 4, which in turn is formed with a crossed driver groove 5 at its leading end face. The stem 2 is further formed at its rear end base with a fixing portion 6 which in turn is formed with a screw thread or one or more fixing ridges.

Figure 2:
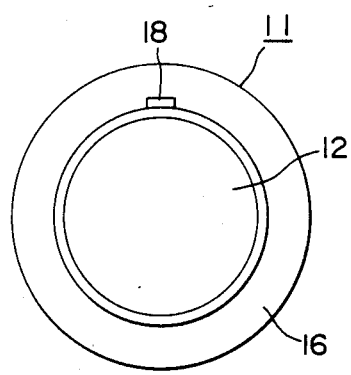
FIG. 2 is a top plan view showing the fastening member of FIG. 1.

Indicated at numeral 11 is a fastening member which is also integrally made of a metal. As shown in FIG. 2, the fastening member 11 has a column-shaped body 12 which has formed in its side with both an insert hole 13, into which the fastening head 4 of the connecting rod 1 is to be inserted, and a slot 14 for receiving the insert 3 of the connecting rod 1 laterally from one side of that insert hole 13. The fastening member 11 is further formed on the inner side of the slot 14 with a tapered eccentric cam face 15 for fastening said fastening head 4. The body 12 is further formed with a flange 16 at the circumference of the lower end thereof and with a crossed driver groove 17 at the lower end face thereof. Moreover, an engagement projection 18 is formed to project from an upper portion of the outer face of the body 12 at the side opposed to the slot 14.

Figure 3:
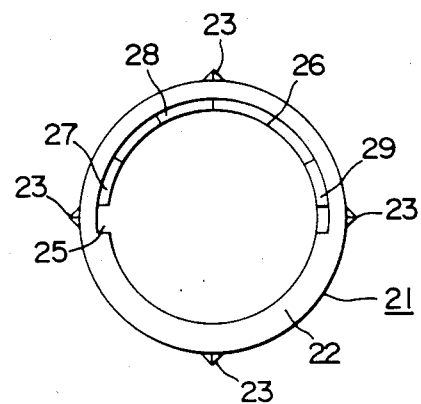
FIG. 3 is a top plan view showing the fastener case of FIG. 1.
Figure 4:
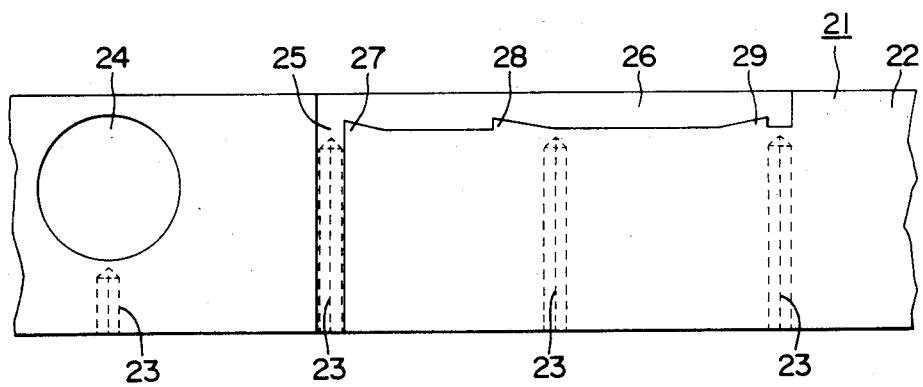
FIG. 4 is an exploded view showing the inner face of the fastener case.
Figure 5:
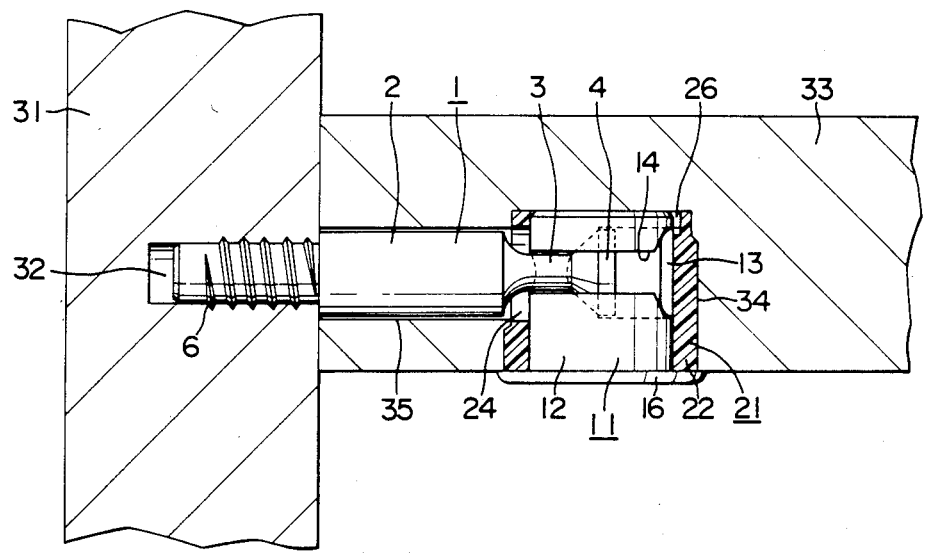
FIG. 5 is a sectional view showing the joining state.
Figure 6:
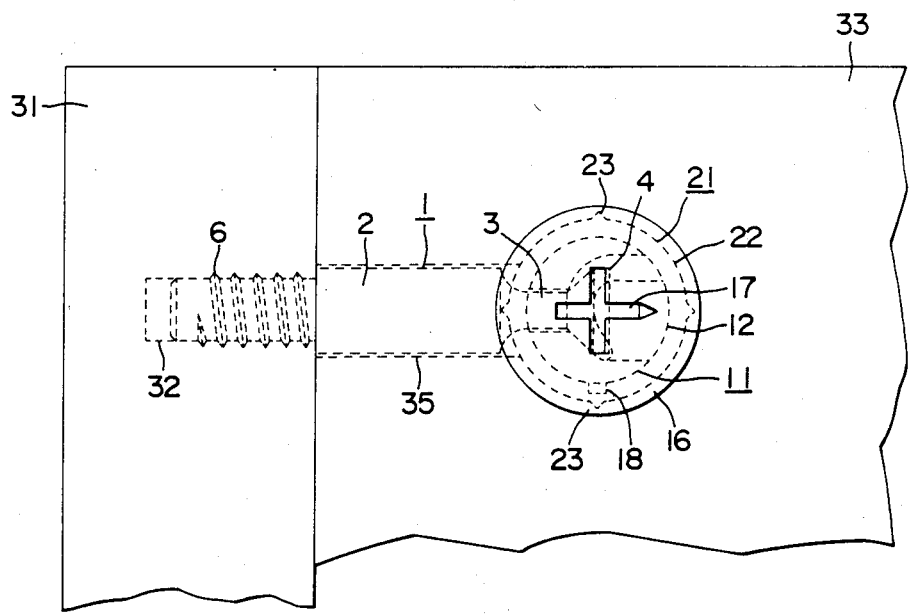
FIG. 6 is a bottom view of FIG. 5.

Indicated at numeral 21 is a fastener case which is integrally made of a synthetic resin. With additional reference to FIGS. 3 and 4, this fastener case 21 has its cylindrical case body 22 adapted to be fitted on the outer side of the fastening member 11. The case body 22 is formed on its outer circumference with a plurality of fixing ridges 23 which extend longitudinally thereof with a predetermined spacing between. In the side of the case body 22, there is formed a circular insert hole 24 which corresponds to the insert hole 13 of the fastening member 11. A longitudinal guide groove 25 is formed in the inner side of the case body 22 for guiding the engagement projection 18 of the fastening member 11. The case body 22 is further formed at an upper portion of the inner side thereof with a step 26 which extends circumferentially thereof for engaging and supporting the engagement projection 18 at the side opposed to the insert hole 24. This step On the other hand, the case body 22 of the fastener case 21 is fitted on the outer side of the body 12 of the fastening member 11. In this case, the fastening member 11 is inserted into the case body 22 from the lower side thereof by having its engagement projection 18 aligned with the guide groove 25 of the case body 22 and is turned in one direction (e.g., in the counter-clockwise direction, as viewed from the lower side thereof), and the engagement projection 18 is moved along the step 26 until it comes into abutment to stop at the terminal end thereof. In this state, the fastening member 11 and the fastener case 21 have their respective insert holes 13 and 24 registered with each other. When the fastening member 11 is to be turned, the engagement projection 18 is caused to ride over the stopper projections 27, 28 and 29 of the step 26 one by one by the elastic force of the synthetic resin material so that it is blocked from reverse turn by the action of the last stopper projection 29. On the other hand, the fastening member 11 may be turned through its driver groove 17 either by means of a driver or manually by the operator.

Then, the fastener case 21 is driven into a mounting hole 34 of second member 33 such as a wooden shelf, ceiling or bottom plate of the furniture until the flange 16 comes into abutment against the lower face of the second member 33 while ensuring the alignment of the insert holes 13 and 24 with a through hole 35 merging into the mounting hole 34. At this time, the case body 22 is fixed in the mounting hole 34 by having its respective fixing ridges 23 biting into the inner face of the mounting hole 34.

Then, the connecting rod 1 fixed to the first member 31 is inserted into the through hole 35 of the second member 33 to bring its fastening head 4 through the insert hole 24 of the fastener case 21 into the insert hole 13 of the fastening member 11.

Then, the fastening member 11 is turned in the direction opposed to the aforementioned turn (i.e., clockwise, as viewed from the bottom thereof) by means of the driver fitted in the driver groove 17, and the fastening head 4 is fastened under the tension of the cam face 15 while the reduced insert 3 of the connecting rod 1 being threaded in the slot 14, until the first member 31 and the second member 33 are joined and fixed.

At this time, the engagement projection 18 of the fastening member 11 is turned while being permitted to ride over the individual stopper projections 27, 28 and 29 of the step 26 of the fastener case 21 by the elastic force of the synthetic resin material thereof, until it is supported in a predetermined fastened position while being finally blocked from its turn by the turn stopper 27.

Thus, even when assembly is made just before use by attaching the fastening member 11 in advance to the second member 33, the fastening member 11 is prevented from coming out of the fastener case 21 during transport by the engagement between the engagement projection 18 and the step 26 and by the fastening force coming from the outer circumference thereof by the fastener case 21. Even if the fastening member 11 should be turned more or less in the joined state to allow its engagement projection 18 to ride over the turn stopper projection 29, it is blocked from further turning by the intermediate stopper projection 28 so that it is prevented from coming out.

According to the present invention, the fastening member is mounted in the mounting hole of a member through the fastener case disposed outside thereof, which in turn is fixed in the member by its fixing ridges, and has its engagement projection engaged with and supported by the step formed on the inner side of the fastener case. As a result, the fastening member is prevented from coming out and is not liable to turn, and the joining work can be smoothly conducted with positioning facilitated.

What is claimed is:

1. An article-joining device comprising:
a connecting rod having its stem formed at the leading end thereof with a fastening head by a reduced intermidate portion and at its base with a fixing portion to be attached to a first member; and
a fastening member adapted to be rotatably fitted in a second member and having its column-shaped body formed in the side thereof with both an insert hole, into which the fastening head of said connecting rod is to be inserted, and a slot for receiving the intermediate portion of said connecting rod laterally from one side of said insert hole, said fastening member being formed on the inner side of said slot with a cam face for fastening said fastening head, wherein the improvement is characterized:
in that said fastening member has its body formed with an engagement projection on one side thereof; and
in that a cylindrical fastener case is provided to be fitted on the outer side of the body of said fastening member and is formed on its outer side with a plurality of fixing ridges to be retained in a mounting hole of said second member, in its side with an insert hole corresponding to the insert hole of said fastening member, in its inner side with a guide groove extending longitudinally thereof for guiding therein the engaging projection of said fastening member, and in an upper portion of its inner side with a step extending circumferentially thereof and merging into said guide groove for engaging and supporting said engaging projection.

2. An article-joining device as claimed in claim 1, wherein said step has turn stopper projections at its portion merging into said guide groove, at its intermediate portion and in the vicinity of its other end.

* * * * *